April 8, 1924.  
A. E. HENDERSON  
1,489,526  
MEANS FOR AND METHOD OF MANUFACTURING TOURNIQUETS  
Filed June 5, 1919  2 Sheets-Sheet 1
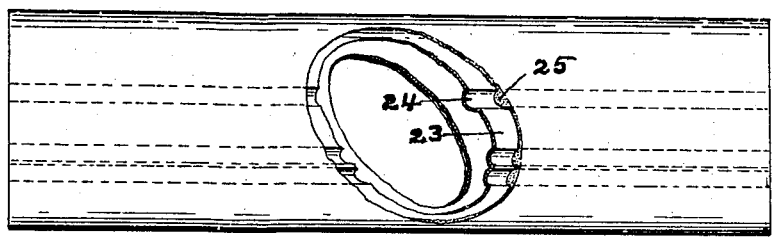
Fig. 1.
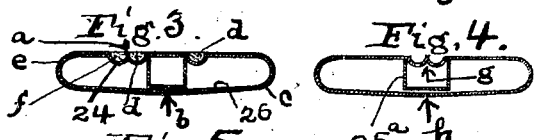
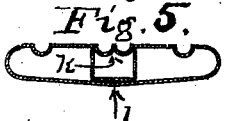
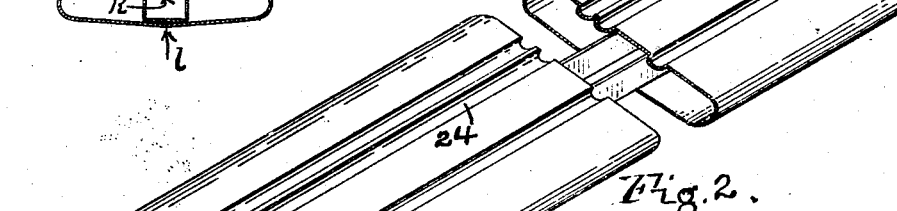
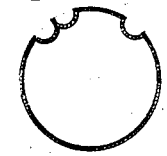
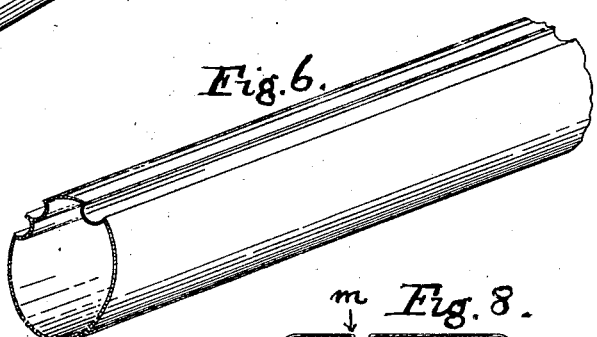
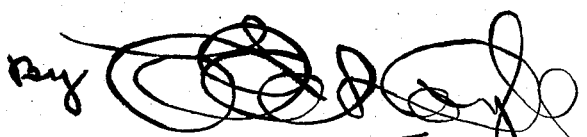
Inventor  
Albert Ennis Henderson  
By [signature]  
Attorney Inventor
Albert Ennis Henderson
By Patented Apr. 8, 1924.

1,489,526

UNITED STATES PATENT OFFICE.

ALBERT ENNIS HENDERSON, OF TORONTO, ONTARIO, CANADA.

MEANS FOR AND METHOD OF MANUFACTURING TOURNIQUETS.

Application filed June 5, 1919. Serial No. 301,916.

*To all whom it may concern:*

Be it known that I, ALBERT ENNIS HENDERSON, a subject of the King of Great Britain, residing at Toronto, in the Province of Ontario and Dominion of Canada, have invented and discovered certain new and useful Improvements in Means for and Methods of Manufacturing Tourniquets, of which the following is a specification.

The object of the invention is to provide a method of and means for manufacturing tourniquets of the elastically extensible type preferably formed of rubber and designed in use to apply a contractile force to a member of the body to which it may be applied for the purpose of checking hemorrhages and, according to the particular purpose for which the same may be used, adapted to be supplied with buttons, bars, or ribs for localizing the pressure, as upon an artery.

In the construction of devices of this type it is desirable to provide means whereby the intensity of the pressure may be varied or graduated to suit the peculiar conditions which may be encountered in special cases, and therefore, in the construction of apparatus for the indicated purpose, especially where the body of the device, as above suggested, is of rubber, it is necessary to employ means of reinforcement for the rubber at intervals to adapt such reinforced portions for intermediate engagement with fastening or holding devices, to the end that having wrapped the tourniquet around a member, and having thereby applied a given stress of contraction thereto it is desirable to hold that pressure at least temporarily, or until an increase or diminution thereof is found necessary.

It is further necessary in connection with apparatus for the purpose described to provide for a maximum of elasticity within a comparatively small compass or length of the device, so that the cumulative effect of a plurality of wraps or windings of the tourniquet may be utilized as a means of increasing the pressure, and to this end it is found desirable to so arrange the elements of the device as to obtain the maximum elastic efficiency of the rubber in sheet form while conserving those properties which are necessary to its durability. For example, in the rolling of sheet rubber there is imparted to it a grain which involves a difference in the contractile properties when a stretching or straining force is applied respectively parallel with and transverse to the grain, it being found that the greater range of elasticity is transverse to the grain while parallel with the grain the resistance to strain beyond the limit of elasticity is more apparent, and, therefore, the method forming an important feature of the invention herein described contemplates the construction of a composite or laminated sheet with the plies so arranged as to be in reinforcing relation.

Further objects and advantages of the invention will appear in the course of the following description, it being understood, however, that various changes in the form, proportion and details of the apparatus and in minor steps of the procedure may be resorted to, within the scope of the appended claims, without departing from the principles involved.

In the drawings:

Figure 1, is a plan view partly broken away of a rolled laminated sheet of rubber, suitably reinforced and having applied thereto the yielding beads designed in the completed product to form the pressure buttons employed as above suggested to localize the effect of the contractile force, said rubber sheet being shown as applied to the mandrel upon which it remains during the vulcanizing step of the procedure.

Fig. 2 is a view in perspective of a mandrel and a portion of a second mandrel to illustrate the manner in which these devices, after the application of the composite sheets of rubber, are supported during the vulcanizing procedure.

Figs. 3, 4 and 5 are detailed sectional views of mandrels showing respectively different arrangements of the bead receiving seats.

Fig. 6 is a view in perspective of a slightly modified form of mandrel.

Fig. 7 is a cross-sectional view of the mandrel illustrated in Figure 6.

Fig. 8 is a sectional view of another modified form of mandrel wherein only a single bead seat is employed.

Figure 9:
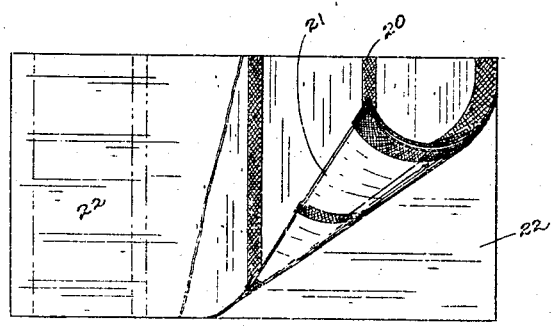
Fig. 9 is a plan view partly broken away of a portion of a composite or laminated sheet to show the relations between the plies thereof and the transversely disposed fabric reinforcing strips.
Figure 10:
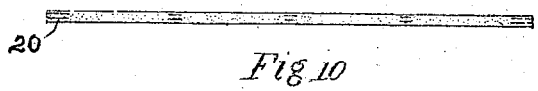
Fig. 10 is a sectional view of the structure shown in Figure 9.

In the development of the device forming the subject of the invention there is employed a plurality of sheets of raw rubber, it having been found desirable to use at least three sheets, as shown in Figure 9 of the drawings, arranged in superposition with a plurality of preferably parallel reinforcing strips 20, of fabric or the equivalent thereof disposed between the intermediate sheet 21 and the exterior or exposed sheets 22, and to roll this composite sheet upon a mandrel 23, in a direction transverse to the lines of the reinforcing strips so as to dispose the latter longitudinally of the mandrel as indicated by the dotted lines in Figure 1. The mandrel, in its preferred form, is provided, as shown clearly in Figure 2 with one or more longitudinal seats 24, formed by inwardly beading the same, the purpose of said seats being to receive rubber or similar compressible beads 25 designed to form elements of the completed product and adapted to be fitted in said seats of the mandrel so that they may be properly positioned with reference to the composite sheet, during the rolling of the latter and its subsequent manipulations including the vulcanization thereof.

Figure 11:
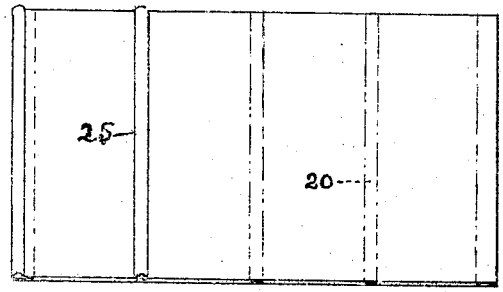
Fig. 11 is a plan view of the inner or reverse side of the sheet illustrated in Figure 9 and indicating in dotted lines the arrangement and location of the reinforcing strips.

The number of bead seats with which the mandrel is provided, or the number which may be utilized in the construction of any particular set of tourniquets, is determined by the proposed construction of the product and the purpose, specifically, for which it is designed. For example, the principal types of tourniquets herein contemplated are provided respectively with either one or two localizing pressure buttons, and by using the mandrel shown in Figure 2, and indicated in section in Figure 3, one complete wrap of the composite sheet will produce a transverse length sufficient to form two tourniquets, adapted after the vulcanizing procedure to be separated from the sheet along the lines transverse to the mandrel as indicated in Figure 11, and separated terminally at points indicated by the darts, $a$ small, $b$ small, in Figure 3. This will produce a tourniquet ($c$) having two pressure buttons ($d$), and another tourniquet ($e$) having a single pressure button ($f$). In the same way a division of the composite vulcanized sheet after it has been formed upon the mandrel shown in Figure 4 upon lines indicated by the darts ($g$), ($h$), will produce two tourniquets of which each is provided with only a single pressure button, while a corresponding division of the sheet which may be formed on the mandrel indicated in Figure 5, at the points shown by the darts ($k$), ($l$), will result in producing two tourniquets each of which is provided with two pressure buttons. The mandrel shown in Figure 8, is designed for use in the construction of a tourniquet of a length equal to the circumferential extent of the mandrel and having only a single pressure button, the point of division in this connection being indicated at ($m$).

As indicated the mandrel is preferably hollow, formed for example of sheet metal so that in the vulcanizing procedure the heat of the furnace may have ready access to the inner surface of the composite rubber sheet formed thereon and the inwardly beaded portions of the upper wall of the mandrel, which serve to provide the seats for the tourniquet beads, also serve as means for positioning the mandrel with reference to a channelled supporting bar 25$^a$, shown clearly in Figure 2, the extremities of which bar extend beyond the terminals of the mandrel for contact with suitable supports within the vulcanizing furnace, a specific illustration of which, in this connection, being deemed unnecessary, and which may be modified as the conditions may demand. For the sake of economy a single supporting bar may, as indicated, be utilized for a plurality of mandrels during the vulcanizing operation, it being preferable to separate the extremities of adjacent mandrels to provide spaces within which the exposed portions of the supporting bar may be engaged with intermediate furnace supports or braces. The object in forming the bead receiving seats of the mandrel in the upper wall thereof is to insure the proper retention of the rubber beads disposed therein in proper relation with the overlying sheet of rubber during the wrapping and vulcanizing operations to the end that a proper joinder of the beads to the sheet may be effected, the weight of the bead being thus positively supported to prevent sagging, and for a similar purpose the lower side of the mandrel is downwardly bulged or arched as shown at 26.

After the composite rubber sheet has been rolled around the mandrel and the overlapping side edges thereof have been joined together or pressed into intimate relations, it is preferable to apply an exterior wrapping of thread or other suitable material so as to maintain the parts in their proper relative positions during the vulcanizing process, and the downward bulging or arching of the lower wall of the mandrel serves to permit this wrapping to hold the rubber sheet upon said lower wall of the mandrel by securing a continuous bearing upon all portions of the surface of the sheet, and this same characteristic in the construction of the mandrel will be found in the form illustrated in Figures 6 and 7, where a more tubular contour is present, the preferred cross-sectional forms being shown however in Figures 2 to 5 inclusive wherein the mandrel is flattened or extended horizontally for the purpose of affording a more convenient arrangement in the vulcanizing furnace and a more satisfactory positioning of the beads designed to form the pressure buttons of the product.

Figure 12:
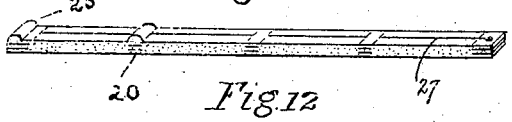
Fig. 12 is a view of a completed tourniquet after it has been separated from the sheet by the longitudinal slitting thereof, and after the band of the tourniquet has been slitted parallel with its side edges and between the spaced transverse reinforcing elements for the purpose of providing intermediate points of engagement with a terminal engaging means.

It will be noted that the apparatus as described provides for the positioning of the rubber beads, of a length coextensive with that of the composite rubber sheet, on lines parallel with the interposed reinforcing fabric strips, the rolling of the sheet around the mandrel being in a direction transverse to said beads and strips, and therefore after the completion of the vulcanizing process the slitting of the sheet upon similar transverse lines as indicated in Figure 11 will separate the same into a plurality of relatively narrow bands as shown in Figure 12, each of which constitutes one or two tourniquets having the required pressure buttons applied in the proper position thereto, the button or buttons being arranged near one end of the band thus formed while the reinforcing strips occur at intervals throughout the length of the band. The final operation in the formation of the tourniquet, which, however, may be performed coincidentally with the separation above indicated, consists in the intermediate longitudinal slitting of the bands as shown at 27 on lines between and parallel with the side edges of the band and extending between the reinforcing elements so that access through said slits may be had to a terminal fastening device for the tourniquet for the purpose of engaging one or the other of the reinforcements therewith.

In the relative arrangement of the commercial sheets of raw rubber in building up the composite sheet to be represented in the completed tourniquet, the several factor sheets are disposed with their grains in intersecting or angularly opposing relations so that in applying tensile strain to the completed tourniquet the stress is applied longitudinally of the grain of one or more of the plies or lamina and transversely of the grain of other plies or lamina, or as indicated in Figure 9, longitudinally of the exterior or exposed plies and transversely of the intermediate ply. In this way the required yielding quality of the tourniquet, in the matter of extension can be secured under conditions insuring such a mutual reinforcement as to materially add to the resistant quality and hence the durability of the product. The possibility of straining the structure beyond the normal limit of elasticity is reduced to the minimum.

I claim:

1. The method of forming tourniquets which consists of rolling a laminated sheet of rubber with reinforcing flexible strips interposed at intervals on lines disposed longitudinally of the roll, vulcanizing and then severing on lines transversely of the roll.

2. The method of forming tourniquets which consists of superposing a plurality of rubber sheets with the grain thereof in intersecting relations, interposing fabric reinforcing strips at intervals between said sheets, rolling the composite sheet thus formed in a direction transverse to the reinforcing strips, vulcanizing and then severing on lines transversely of the roll.

3. The method of forming tourniquets which consists of producing a composite plural ply sheet of rubber with interposed strips of reinforcing fabric disposed at intervals, applying to the surface of the sheet a rubber bead in parallelism with said strips, rolling the sheet in a direction transverse to said beads, vulcanizing while maintaining the elements in the indicated relations, and finally severing on lines transverse to said bead to form independent bands.

4. The method of forming tourniquets which consists in providing a laminated rubber sheet with incorporated fabric strips, rolling said sheet transversely of the strips on a longitudinally grooved mandrel, rubber beads having previously been placed in the grooves of the mandrel, binding the sheets upon the mandrel in contact with said beads, vulcanizing and severing on lines transversely of the roll.

5. The method of forming tourniquets which consists in providing a mandrel having one or more longitudinal surface grooves, forming seats for rubber beads, binding the sheet in contact with the beads, placing beads in said seats, rolling a sheet of rubber on the mandrel, vulcanizing and severing on lines transversely of the roll.

6. The method of forming tourniquets which consists in producing a composite plural ply sheet of rubber having incorporated therein parallel reinforcing fabric strips disposed at intervals, applying a rubber bead to the surface of the sheet on a line parallel with said strips, vulcanizing, severing on lines transverse to the bead and strips, and finally slitting in parallelism with and between the lines of separation, and between the reinforcing strips.

7. The means for forming tourniquets which consists of a hollow mandrel having one or more indented longitudinal bead seats, and a channelled supporting bar extending longitudinally throughout the mandrel in engagement with said seats.

8. The means for forming tourniquets which consists of a hollow inwardly beaded mandrel in combination with a channelled supporting bar, said mandrel having the beads disposed longitudinally in its upper side and having a downwardly bulged lower side.

ALBERT ENNIS HENDERSON.